United States Patent
Mathew et al.

(10) Patent No.: US 9,401,641 B2
(45) Date of Patent: Jul. 26, 2016

(54) SYSTEMS AND METHODS FOR SELF-CALIBRATION OF A VOLTAGE REGULATOR

(71) Applicant: Dell Products L.P., Round Rock, TX (US)

(72) Inventors: Abey K. Mathew, Georgetown, TX (US); John J. Breen, Harker Heights, TX (US)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 14/518,673

(22) Filed: Oct. 20, 2014

(65) Prior Publication Data

US 2016/0111957 A1    Apr. 21, 2016

(51) Int. Cl.
*G05F 1/00* (2006.01)
*G05F 1/565* (2006.01)
*H02M 3/158* (2006.01)

(52) U.S. Cl.
CPC ............................ *H02M 3/158* (2013.01)

(58) Field of Classification Search
CPC ......... G05F 1/445; G05F 1/455; G05F 1/462; G05F 1/465; G05F 1/56; G05F 1/563; G05F 1/565; G05F 1/569; G05F 1/571; G05F 1/573; G05F 1/575; G05F 1/59; G05F 1/595; H02M 3/157; H02M 3/158
USPC ................. 323/241, 246, 266, 269, 271, 272, 323/275–277, 283–285
See application file for complete search history.

(56) References Cited

U.S. PATENT DOCUMENTS

| | | | | |
|---|---|---|---|---|
| 7,262,628 B2 * | 8/2007 | Southwell | ........... | H02M 3/1584 323/266 |
| 7,791,324 B2 | 9/2010 | Mehas et al. | | |
| 2008/0265683 A1 * | 10/2008 | Zhu | .......................... | H02J 1/08 307/80 |
| 2010/0164477 A1 * | 7/2010 | Trivedi | ...................... | G06F 1/26 324/107 |
| 2011/0221405 A1 * | 9/2011 | Tang | ...................... | H02M 3/156 323/234 |
| 2011/0267019 A1 * | 11/2011 | Krishnamurthy | ... | H02M 3/1584 323/283 |
| 2013/0057240 A1 * | 3/2013 | Zambetti | ............. | H02M 3/1584 323/271 |
| 2014/0344600 A1 * | 11/2014 | Breen | ................. | H02M 3/1584 713/323 |

* cited by examiner

*Primary Examiner* — Adolf Berhane
*Assistant Examiner* — Gary Nash
(74) *Attorney, Agent, or Firm* — Jackson Walker L.L.P.

(57) ABSTRACT

A method may include causing a first test current to be delivered for a period of time from a phase of a voltage regulator to a load coupled to the voltage regulator, the phase configured to deliver electrical energy to the load. The method may also include measuring a first measured output current associated with the first test current. The method may further include causing a second test current to be delivered from the phase to the load for the period of time, the second test current differing from the first test current by a known offset. The method may additionally include measuring a second measured output current associated with the second test current. The method may also include calculating the respective gain and the respective offset of the phase based on the first measured output current, the second measured output current, the period of time, and the known offset.

15 Claims, 3 Drawing Sheets

| PHASE | GAIN(m) | OFFSET(c) |
|---|---|---|
| 1 | $M_1$ | $C_1$ |
| 2 | $M_2$ | $C_2$ |
| ⋮ | ⋮ | ⋮ |
| N | $M_N$ | $C_N$ |

FIG. 2

SYSTEMS AND METHODS FOR SELF-CALIBRATION OF A VOLTAGE REGULATOR

TECHNICAL FIELD

The present disclosure relates in general to information handling systems, and more particularly to sensing a current associated with a voltage regulator in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a voltage regulator to provide a constant voltage level and a current to power the system. For example, a voltage regulator may receive an input voltage and produce an output current at a predetermined output voltage required by a load, i.e., the circuit element(s) for which it is providing power. Moreover, modern information handling systems may include components that maintain current requirements across a broad range from relatively high peak currents to very low stable currents. More particularly, voltage regulators may be required to maintain a high efficiency, or low power loss, over such ranges. In particular, a direct current to direct current (DC-DC) voltage regulator may include a controller, one or more drivers, and one or more power stages. Furthermore, a power stage may include one or more metal-oxide-semiconductor-field-effect-transistors (MOSFETs), which may be driven by the drivers.

Additionally, some voltage regulators may be capable of operating in multiple phases. To this end, the concept of a phase for a voltage regulator may typically refer to combining a driver and a power stage to form one phase. Thus, a multi-phase voltage regulator may include multiple instances of such combinations. Alternatively, a multi-phase voltage regulator may be thought of as a combination of single phase voltage regulators. For example, a multi-phase voltage regulator may include a plurality of single phase voltage regulators coupled in parallel to provide varying ranges of output current. During periods of high loads, the multi-phase voltage regulator may function with all phases in operation. In contrast, for lower loads, it may employ phase-shedding and operate with a reduced number of phases.

To manage power delivery and consumption by voltage regulators, power control systems in information handling systems often execute power management algorithms. For such power management algorithms to effectively manage power, accurate power, current, voltage, and/or other measurements must be obtained. An inherent conflict in obtaining power measurements is that measurement circuitry itself may add power losses to a system.

Existing approaches to measuring current associated with a voltage regulator include sensing a current in a component of a voltage regulator, such as an output inductor of a power stage of a voltage regulator phase, which may have a parasitic impedance. Current flowing through such an inductor is linearly proportional to a voltage drop across such parasitic impedance. Thus by measuring a voltage across such components, a current associated with a voltage regulator may be obtained.

An advantage of using an output inductor to obtain a current is that such parasitic impedance and its power losses are inherent to a voltage regulator, and thus such measurement approaches add little or no appreciable power consumption themselves. However, the parasitic impedance may have a large range of variation, and thus may result in unacceptable measurement error.

SUMMARY

In accordance with the teachings of the present disclosure, the disadvantages and problems associated with current sensing in a voltage regulator have been reduced or eliminated.

In accordance with embodiments of the present disclosure, an information handling system may include an information handling resource, a voltage regulator, and a controller. The voltage regulator may be coupled to the information handling resource, the voltage regulator comprising one or more voltage regulator phases, each of the one or more voltage regulator phases configured to deliver electrical energy to the information handling resource. The controller may be coupled to the voltage regulator and configured to perform a calibration operation for each of the one or more voltage regulator phases in order to calculate a respective gain and a respective offset for each particular phase of the one or more voltage regulator phases, wherein the respective gain and the respective offset define a linear relationship between a measured output current of the particular phase and an actual output current of the particular phase, and further wherein calculating the respective gain and the respective offset for each particular phase of the one or more voltage regulator phases comprises: (i) causing a first test current to be delivered from the particular phase to the information handling resource for a period of time; (ii) measuring a first measured output current associated with the first test current; (iii) causing a second test current to be delivered from the particular phase to the information handling resource for the period of time, the second test current differing from the first test current by a known offset; (iv) measuring a second measured output current associated with the second test current; and (v) calculating the respective gain and the respective offset of the particular phase based on the first measured output current, the second measured output current, the period of time, and the known offset.

In accordance with these and other embodiments of the present disclosure, a method may include causing a first test current to be delivered for a period of time from a phase of a voltage regulator to a load coupled to the voltage regulator, the phase configured to deliver electrical energy to the load. The method may also include measuring a first measured output current associated with the first test current. The method may further include causing a second test current to be delivered from the phase to the load for the period of time, the second test current differing from the first test current by a known offset. The method may additionally include measuring a second measured output current associated with the second test current. The method may also include calculating the respective gain and the respective offset of the phase based on the first measured output current, the second measured output current, the period of time, and the known offset.

In accordance with these and other embodiments of the present disclosure, a power system may include a voltage regulator coupled to a load and a controller. The voltage regulator may comprise one or more voltage regulator phases, each of the one or more voltage regulator phases configured to deliver electrical energy to the load. The controller may be coupled to the voltage regulator and configured to perform a calibration operation for each of the one or more voltage regulator phases in order to calculate a respective gain and a respective offset for each particular phase of the one or more voltage regulator phases, wherein the respective gain and the respective offset define a linear relationship between a measured output current of the particular phase and an actual output current of the particular phase, and further wherein calculating the respective gain and the respective offset for each particular phase of the one or more voltage regulator phases comprises: {i) causing a first test current to be delivered from the particular phase to the load for a period of time; (ii) measuring a first measured output current associated with the first test current; (iii) causing a second test current to be delivered from the particular phase to the load for the period of time, the second test current differing from the first test current by a known offset; (iv) measuring a second measured output current associated with the second test current; and (v) calculating the respective gain and the respective offset of the particular phase based on the first measured output current, the second measured output current, the period of time, and the known offset.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates example contents of a gain/offset table for use by the voltage regulator controller depicted in FIG. 1, in accordance with embodiments of the present disclosure.

DETAILED DESCRIPTION

Figure 1:
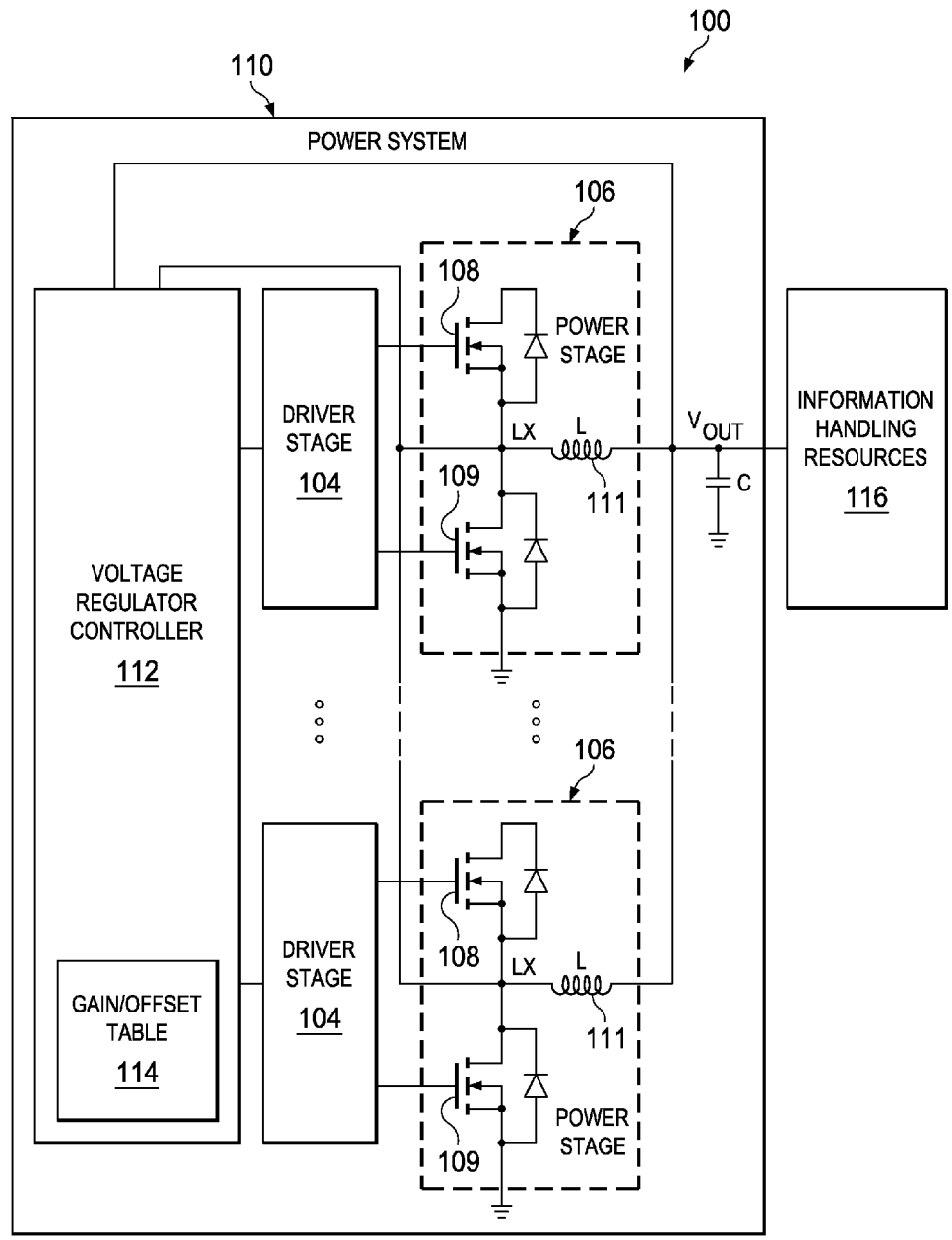
FIG. 1 illustrates a block diagram of an example of an information handling system, in accordance with embodiments of the present disclosure.
Figure 2:
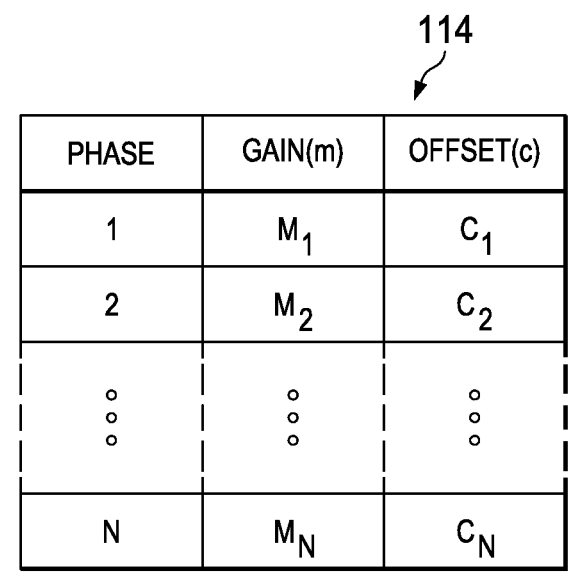
Figure 3:
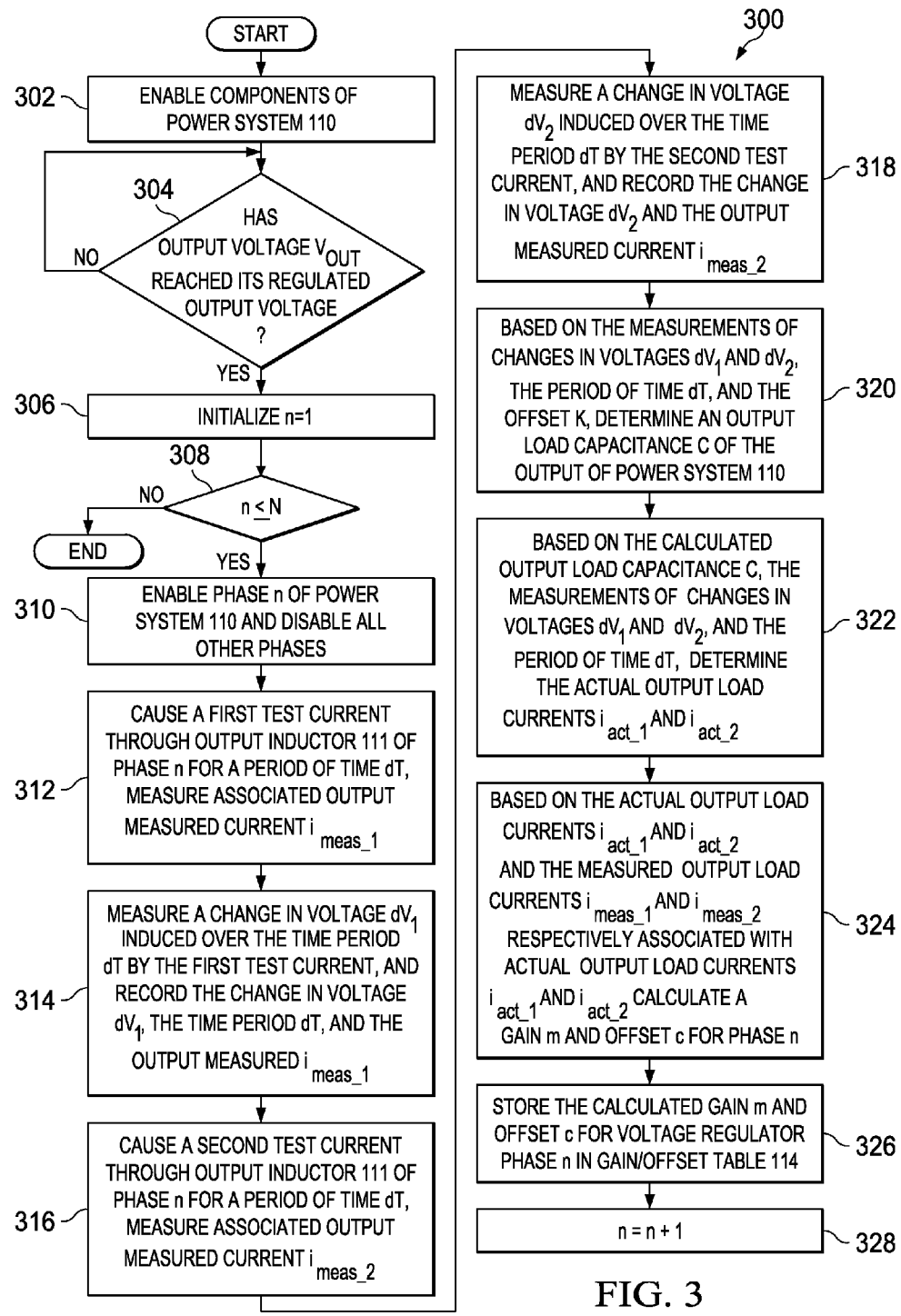
FIG. 3 illustrates a flow chart of an example method for self-calibration of a voltage regulator, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 100 incorporating a power system 110 in accordance with an embodiment of the present disclosure. As depicted, information handling system 100 may include a power system 110, and one or more other information handling resources 116.

Generally speaking, power system 110 may include any system, device, or apparatus configured to supply electrical current to one or more information handling resources 116.

In some embodiments, power system 110 may include a multi-phase voltage regulator.

Power system 110 may include a voltage regulator controller 112 and a plurality of voltage regulator phases wherein each voltage regulator phase comprises a driver stage 104 and a power stage 106. Voltage regulator controller 112 may include any system, device, or apparatus configured to control the output of power system 110 and/or selectively enable and disable voltage regulator phases. Although FIG. 1 depicts voltage regulator controller 112 as being integral to power system 110, in some embodiments, some or all of the structure and/or functionality of voltage regulator controller 112 may be integral to another information handling resource 116 of information handling system 100. For example, in some embodiments, some of the structure and/or functionality of voltage regulator controller 112 may be integral to a remote access controller, such as a Dell Remote Access Controller (DRAC) or Integrated Dell Remote Access Controller (iDRAC).

As stated above, each voltage regulator phase may include a driver stage 104 and a power stage 106. A voltage regulator phase may include any system, device, or apparatus configured to supply a portion of the total current output of power system 110. In embodiments in which power system 110 is a multi-phase voltage regulator, a voltage regulator phase may comprise a phase of the voltage regulator.

A driver stage 104 may include a high-side driver and a low-side driver LDRV. A power stage 106 may comprise a high-side switch 108, low-side switch 109, and output inductor 111. High-side switch 108 may comprise any suitable switching device (e.g., a metal-oxide-semiconductor field-effect transistor or "MOSFET") located between a positive terminal of a power supply $V_{IN}$ and a load, while low-side switch 109 may comprise any suitable switching device (e.g., a MOSFET) located between the load and a negative terminal of the power supply or ground. A phase node voltage LX may be generated based on the supply voltage $V_{IN}$ and switching of switches 108 and 109 and may also indicate a junction point between high-side switch 108 and low-side switch 109. Output inductor 111 may be coupled between phase node LX and the output of the voltage regulator phase, which may serve to boost or reduce supply voltage $V_{IN}$ to generate output voltage $V_{OUT}$ such that the voltage regulator phase functions as a direct-current to direct-current voltage converter.

In operation, driver 104 may activate and deactivate high-side switches 108 and low-side switches 109 in response to a switching signal from voltage regulator controller 112. High-side switches 108 and low-side switches 109 may operate in a complementary mode, with one of the high-side switches 108 and low-side switches 109 of each phase activated and one deactivated during steady-state operating conditions. When a high-side switch 108 of a phase is activated and its corresponding low-side switch 109 is deactivated, the input power will charge the inductor 111 and supply a current to information handling resources 116. Conversely, when the low-side switch 109 is activated and the high-side switch 108 is deactivated, the inductor current will be discharged by a freewheeling loop consisting of inductor 111, an output capacitor coupled between $V_{OUT}$ and a ground voltage, and low-side switch 109.

Although FIG. 1 depicts two voltage regulator phases each comprising a driver stage 104 and power stage 106, power system 110 may include any suitable number of voltage regulator phases.

Generally speaking, information handling resources 116 may include any component system, device or apparatus of information handling system 100, including without limitation processors, buses, computer-readable media, input-output devices and/or interfaces, storage resources, network interfaces, motherboards, electro-mechanical devices (e.g., fans), displays, and/or power supplies.

In operation, voltage regulator controller 112 may selectively enable and disable one or more voltage regulator phases in response to an electrical power requirement of information handling resources 116, such that one or more phases may be shed to reduce power consumption of power system 110 in response to the reduced current requirement, and thus increase power efficiency of information handling system 100. Accordingly, voltage regulator controller 112 may control driver stages 104 such that the appropriate power stages 106 provide the desired level of power to information handling resources 116.

In addition, voltage regulator controller 112 may be configured to measure a measured output current for each respective voltage regulator phase. For example, voltage regulator 112 may measure a voltage across an output inductor 111 of a phase (e.g., the voltage difference between an output voltage VOUT and a voltage present at phase node voltage LX of such phase) and determine the measured output current of the phase to be equal to the measured voltage divided by a nominal parasitic impedance of output inductor 111.

However, due to process and/or other variations, an actual impedance of an output inductor 111 may vary from its nominal parasitic impedance. Thus, an actual output current of a phase may differ significantly from its measured output current. Accordingly, voltage regulator controller 112 may also be configured to calibrate each phase of power system 110 in order to account for ranges of variation in parasitic impedances of output inductors 111 which may result in measurement error. An example of such a process for calibration is described in greater detail below in reference to FIG. 3.

As a result of calibration operations, voltage regulator controller 112 may maintain calibration information in a gain/offset table 114. Gain/offset table 114 may comprise a table, map, list, array, and/or other suitable data structure stored on computer-readable media integral to or otherwise accessible to voltage regulator controller 112. As shown in FIG. 2, gain/offset table 114 may comprise an entry for each voltage regulator phase of power system 110, and each entry may set forth a gain m and an offset c for each respective voltage regulator phase. The gain m and offset c for each voltage regulator phase may define a linear relationship between an actual output current $i_{act}$ for the voltage regulator phase and a measured output current $i_{meas}$ for which may be given by the equation:

$$i_{act} = m \cdot i_{meas} + c \qquad \text{(eq. 1)}$$

The calculation of the various values of gain m and offset c for each voltage regulator phase may be made in accordance with the calibration operation described in greater detail with respect to FIG. 3. FIG. 3 illustrates a flow chart of an example method 300 for self-calibration of a voltage regulator, in accordance with embodiments of the present disclosure. According to one or more embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, voltage regulator controller 112 may enable components of power system 110. At step 304, voltage regulator controller 112 may determine if output voltage $V_{OUT}$ has reached its regulated output voltage. If output voltage $V_{OUT}$ has reached its regulated output voltage, method 300 may proceed to step 306. Otherwise, method 300 may remain at step 304 until output voltage $V_{OUT}$ reaches its regulated output voltage.

At step 306, in response to output voltage $V_{OUT}$ reaching its regulated output voltage, voltage regulator controller 112 may initialize one or more calibration variables. For example, voltage regulator controller 112 may initialize a counter variable n to an initial value (e.g., 1). It should be noted that, in some embodiments, voltage regulator controller 112 may initiate calibration prior to output voltage $V_{OUT}$ reaching its regulated output voltage, or even before a phase is enabled, meaning calibration may take place when output voltage $V_{OUT}$ is at zero. In such embodiments, method 300 may not include step 304, and method 300 may proceed from step 302 to step 306.

At step 308, voltage regulator controller 112 may determine if all phases N of power system 110 have been calibrated by comparing the counter variable n to the value N. If n is less than or equal to N, method 300 may proceed to step 310. Otherwise, method 300 may end.

At step 310, voltage regulator controller 112 may enable phase n of power system 110 and disable all other phases.

At step 312, voltage regulator controller 112 may cause a first test current through output inductor 111 of phase n for a period of time dT (e.g., 50-100 μs). The actual output current $i_{act\_1}$ of the first test current may not be known, but may be measured by voltage regulator controller 112 as an output measured current $i_{meas\_1}$, which may be a current reported by measuring a voltage across a parasitic resistance of output indictor 111.

At step 314, voltage regulator controller 112 may measure a change in voltage $dV_1$ induced over the time period dT by the first test current, and record the change in voltage $dV_1$, the time period dT, and the output measured current $i_{meas\_1}$.

At step 316, voltage regulator controller 112 may cause a second test current through output inductor 111 of phase n for the period of time dT. The actual output current $i_{act\_2}$ of the second test current may not be known, but may be different from actual output current $i_{act\_2}$ by a known offset K such that $i_{act\_2} = i_{act\_1} + K$, and may be measured by voltage regulator controller 112 as an output measured current $i_{meas\_2}$, which may be a current reported by measuring a voltage across a parasitic resistance of output indictor 111.

At step 318, voltage regulator controller 112 may measure a change in voltage $dV_2$ induced over the time period dT by the second test current, and record the change in voltage $dV_2$ and the output measured current $i_{meas\_2}$. In some embodiments, prior to application of the second test current, the output voltage $V_{OUT}$ and the current through output inductor 111 may be set to the respective values they had prior to application of the first test current.

At step 320, voltage regulator controller 112 may, based on the measurements of changes in voltages $dV_1$ and $dV_2$, the period of time dT, and the offset K, determine an output load capacitance C of the output of power system 110. To illustrate, the actual currents $i_{act\_a}$ and $i_{act\_2}$ may be given by the equations:

$$i_{act\_1} = C \cdot dV_1/dT \quad \text{(eq. 2)}$$

$$i_{act2} = i_{act\_1} + K = C \cdot dV_2/dT \quad \text{(eq. 3)}$$

Substituting eq. 2 into eq. 3:

$$C \cdot dV_1/dT + K = C \cdot dV_2/dT$$

and solving eq. 3 for output load capacitance C:

$$C = K/(dV_2/dT - dV_1/dT)$$

Because values of K, dT, $dV_1$, and $dV_2$ are known, output load capacitance C may be calculated. In some embodiments, instead of the period of time dT being the same for the application of each test current, in some embodiments, a first test current and second test current may be applied such that they induce the same voltage change dV, in which case capacitance C is determined based on the different period of time in which the two test currents induce a voltage change dV.

At step 322, voltage regulator controller 112 may, based on the calculated output load capacitance C, the measurements of changes in voltages $dV_1$ and $dV_2$, and the period of time dT, determine the actual output load currents $i_{act\_1}$ and $i_{act\_2}$ using eqs. 2 and 3.

At step 324, voltage regulator controller 112 may, based on the actual output load currents $i_{act1}$ and $i_{act\_2}$ and the measured output load currents $i_{meas\_1}$ and $i_{meas\_2}$ respectively associated with actual output load currents $i_{act\_1}$ and $i_{act\_2}$ calculate a gain m and offset c for phase n by solving for gain m and offset c the equations:

$$i_{act\_1} = m \cdot i_{meas\_1} + c$$

$$i_{act\_2} = m \cdot i_{meas\_2} + c$$

At step 326, voltage regulator controller 112 may store the calculated gain m and offset c for voltage regulator phase n in gain/offset table 114.

At step 328, voltage regulator controller 112 may increment the counter n by 1. After completion of step 328, method 300 may return again to step 308.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software and/or firmware embodied in computer-readable media and executable on a processor of information handling system 100.

After calibration, and during regular operation of power system 110, voltage regulator controller 112 may read a measured current $i_{meas}$ associated with a phase, and determine an actual current $i_{act}$ for the phase in accordance with the calibrated values gain m and offset c stored in an entry of gain/offset table 114 corresponding to the phase, in accordance with eq. 1.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
an information handling resource;
a voltage regulator coupled to the information handling resource, the voltage regulator comprising one or more voltage regulator phases, each of the one or more voltage regulator phases configured to deliver electrical energy to the information handling resource; and
a controller coupled to the voltage regulator and configured to perform a calibration operation for each of the one or more voltage regulator phases in order to calculate a respective gain and a respective offset for each particular phase of the one or more voltage regulator phases, wherein the respective gain and the respective offset define a linear relationship between a measured output current of the particular phase and an actual output current of the particular phase, and further wherein calculating the respective gain and the respective offset for each particular phase of the one or more voltage regulator phases comprises:
causing a first test current to be delivered from the particular phase to the information handling resource for a period of time;
measuring a first measured output current associated with the first test current;
causing a second test current to be delivered from the particular phase to the information handling resource for the period of time, the second test current differing from the first test current by a known offset;
measuring a second measured output current associated with the second test current; and
calculating the respective gain and the respective offset of the particular phase based on the first measured output current, the second measured output current, the period of time, and the known offset.

2. The information handling system of claim 1, wherein calculating the respective gain and the respective offset of the particular phase further comprises:
measuring a first change in output voltage associated with the first test current;
measuring a second change in output voltage associated with the second test current; and
calculating an output capacitance of the particular phase based on the first change in output voltage, the second change in output voltage, the period of time, and the known offset.

3. The information handling system of claim 2, wherein calculating the respective gain and the respective offset of the particular phase further comprises:
determining an actual value of the first test current based on the output capacitance and the first measured output current; and
determining an actual value of the second test current based on the output capacitance and the second measured output current.

4. The information handling system of claim 3, wherein calculating the respective gain and the respective offset of the particular phase further comprises calculating the respective gain and the respective offset of the particular phase based on the actual value of the first test current, the actual value of the second test current, the first measured output current, and the second measured output current.

5. The information handling system of claim 1, wherein the first measured output current and the second measured output current are determined based on measured voltages across an output inductor of the particular phase and a nominal parasitic resistance of the output inductor.

6. A method comprising:
causing a first test current to be delivered for a period of time from a phase of a voltage regulator to a load coupled to the voltage regulator, the phase configured to deliver electrical energy to the load;
measuring a first measured output current associated with the first test current;
causing a second test current to be delivered from the phase to the load for the period of time, the second test current differing from the first test current by a known offset;
measuring a second measured output current associated with the second test current; and
calculating the respective gain and the respective offset of the phase based on the first measured output current, the second measured output current, the period of time, and the known offset.

7. The method of claim 6, wherein calculating the respective gain and the respective offset of the phase further comprises:
measuring a first change in output voltage associated with the first test current;
measuring a second change in output voltage associated with the second test current; and
calculating an output capacitance of the phase based on the first change in output voltage, the second change in output voltage, the period of time, and the known offset.

8. The method of claim 7, wherein calculating the respective gain and the respective offset of the phase further comprises:
determining an actual value of the first test current based on the output capacitance and the first measured output current; and
determining an actual value of the second test current based on the output capacitance and the second measured output current.

9. The method of claim 8, wherein calculating the respective gain and the respective offset of the phase further comprises calculating the respective gain and the respective offset of the phase based on the actual value of the first test current, the actual value of the second test current, the first measured output current, and the second measured output current.

10. The method of claim 6, wherein the first measured output current and the second measured output current are determined based on measured voltages across an output inductor of the phase and a nominal parasitic resistance of the output inductor.

11. A power system comprising:
a voltage regulator coupled to a load, the voltage regulator comprising one or more voltage regulator phases, each of the one or more voltage regulator phases configured to deliver electrical energy to the load; and
a controller coupled to the voltage regulator and configured to perform a calibration operation for each of the one or more voltage regulator phases in order to calculate a respective gain and a respective offset for each particular phase of the one or more voltage regulator phases, wherein the respective gain and the respective offset define a linear relationship between a measured output current of the particular phase and an actual output current of the particular phase, and further wherein calculating the respective gain and the respective offset for each particular phase of the one or more voltage regulator phases comprises:

causing a first test current to be delivered from the particular phase to the load for a period of time;

measuring a first measured output current associated with the first test current;

causing a second test current to be delivered from the particular phase to the load for the period of time, the second test current differing from the first test current by a known offset;

measuring a second measured output current associated with the second test current; and calculating the respective gain and the respective offset of the particular phase based on the first measured output current, the second measured output current, the period of time, and the known offset.

12. The power system of claim 11, wherein calculating the respective gain and the respective offset of the particular phase further comprises:

measuring a first change in output voltage associated with the first test current;

measuring a second change in output voltage associated with the second test current; and calculating an output capacitance of the particular phase based on the first change in output voltage, the second change in output voltage, the period of time, and the known offset.

13. The power system of claim 12, wherein calculating the respective gain and the respective offset of the particular phase further comprises:

determining an actual value of the first test current based on the output capacitance and the first measured output current; and determining an actual value of the second test current based on the output capacitance and the second measured output current.

14. The power system of claim 13, wherein calculating the respective gain and the respective offset of the particular phase further comprises calculating the respective gain and the respective offset of the particular phase based on the actual value of the first test current, the actual value of the second test current, the first measured output current, and the second measured output current.

15. The power system of claim 11, wherein the first measured output current and the second measured output current are determined based on measured voltages across an output inductor of the particular phase and a nominal parasitic resistance of the output inductor.

* * * * *